ized aluminum layer as seen through said polyester lamination film.

United States Patent
Leatherwood et al.

(10) Patent No.: US 8,012,595 B2
(45) Date of Patent: Sep. 6, 2011

(54) APPLIANCE PANEL WITH STAINLESS STEEL LOOK

(75) Inventors: Kevin R. Leatherwood, Evansville, IN (US); Franklin G. Katje, Evansville, IN (US); David L. Benefiel, Oakland City, IN (US); David E. Elsner, Newburgh, IN (US); David M. Lewis, Fort Smith, AR (US)

(73) Assignee: Whirlpool Corporation, Benton Harbor, MI (US)

( * ) Notice: Subject to any disclaimer, the term of this patent is extended or adjusted under 35 U.S.C. 154(b) by 714 days.

(21) Appl. No.: 10/979,591

(22) Filed: Nov. 2, 2004

(65) Prior Publication Data

US 2006/0093774 A1    May 4, 2006

(51) Int. Cl.
*B32B 15/09* (2006.01)
*B29C 65/48* (2006.01)

(52) U.S. Cl. ........ 428/458; 428/457; 156/153; 156/196; 156/221

(58) Field of Classification Search .................. None
See application file for complete search history.

(56) References Cited

U.S. PATENT DOCUMENTS

| | | | |
|---|---|---|---|
| 3,125,471 A * | 3/1964 | Conner, Jr. .................. 428/336 |
| 4,374,683 A * | 2/1983 | Koike et al. .................. 148/610 |
| 4,459,772 A * | 7/1984 | Kanzelberger .................. 40/745 |
| 4,520,053 A * | 5/1985 | Marentic .......................... 428/31 |
| 4,826,713 A * | 5/1989 | Cook ................................ 428/31 |
| 4,916,008 A * | 4/1990 | Katayama et al. ............. 428/205 |
| 4,918,800 A * | 4/1990 | Reafler ........................ 29/527.2 |
| 5,118,372 A * | 6/1992 | Spahn ............................ 156/160 |
| 5,372,867 A | 12/1994 | Hasegawa et al. ............ 428/141 |
| 5,384,354 A | 1/1995 | Hasegawa et al. ............. 524/539 |
| 5,698,308 A | 12/1997 | Sumiya et al. ............. 428/317.9 |
| 6,551,722 B2 * | 4/2003 | Jonte et al. .................... 428/687 |
| 6,840,773 B2 * | 1/2005 | Anderson et al. ............... 434/73 |
| 2003/0190485 A1 * | 10/2003 | Takatsuki et al. ............. 428/458 |
| 2004/0200564 A1 * | 10/2004 | Kinsey et al. .................. 156/230 |

* cited by examiner

*Primary Examiner* — Monique R Jackson
(74) *Attorney, Agent, or Firm* — Kirk W. Goodwin; John W. Morrison; Diederiks & Whitelaw PLC

(57) ABSTRACT

An appliance is provided having a panel formed of a magnetizable material and a polyester lamination film adhered to an outer surface of the panel, wherein the polyester lamination film provides a stainless steel appearance to the panel. The polyester lamination film may be a polyester film layer with a backside brushed, a vacuum metallized aluminum layer deposited on the backside of the polyester film layer, and a tinted coating layer provided on a front side of the polyester film layer. The tinted coating layer may be colored to provide a correct color rendition of the metallized aluminum layer as stainless steel, as seen through said polyester lamination film. A strippable film layer may be applied over the polyester lamination film to protect the panel during manufacture. The magnetizable material of the panel may be rolled steel. The panel may have bends in its surface.

16 Claims, 1 Drawing Sheet

APPLIANCE PANEL WITH STAINLESS STEEL LOOK

BACKGROUND OF THE INVENTION

The present invention relates to appliances, appliance panels and methods of construction of appliance panels.

Domestic and commercial appliances, such as refrigerators, freezers, washers, dryers, dishwashers, ovens, stoves, ice makers, water dispenser, humidifiers, dehumidifiers, etc., typically are formed with an outer cabinet made from panels, wherein each panel may comprise one or more sides of the appliance, or less than a full side. The cabinets also generally contain doors or other movable panels that may comprise the same or different material than that of the remainder of the appliance. Typically the panels of the appliances are provided in a variety of appearances, such as wood covered, painted metal or unpainted metal, such as stainless steel.

An advantage of certain metal panels is that the material of the panel is magnetizable such that magnets will adhere to the panel, allowing the user to removably attach papers and other light materials to the appliance, without defacing the panel surface. Stainless steel, however, is not magnetizable, and thus those cabinet panels formed of stainless steel do not permit the attachment of magnets. Further, stainless steel, although highly durable, is a relatively expensive material, in comparison for example, with rolled steel which is generally used in the formation of many painted metal appliance panels.

Therefore it would be an improvement in the art if there were provided an appliance panel formed of a magnetizable material that had the appearance of stainless steel. It would also be an improvement in the art if there were provided an appliance panel formed of a material that had the appearance of stainless steel, and the durability of stainless steel, yet had a lower cost than stainless steel.

SUMMARY OF THE INVENTION

The present invention provides an appliance cabinet panel formed of a magnetizable sheet material and a polyester lamination film adhered to a surface of the panel, wherein the polyester lamination film provides a stainless steel appearance to the cabinet panel. The polyester lamination film has the required durability features and characteristics necessary to provide a long service life for the panel without deterioration and discoloration. The magnetizable material may comprise rolled steel, which is relatively low in cost compared to stainless steel. The cost of polyester film, even when combined with that of rolled steel, is also relatively low compared to stainless steel.

The polyester lamination film may comprise a polyester film layer with a backside brushed to give a grain appearance simulating that of stainless steel, a vacuum metallized aluminum layer deposited on the backside of the polyester film layer to provide a bright and shiny color, and a tinted coating layer provided on a front side of the polyester film layer. The tinted coating layer should be colored to provide a correct color rendition of the metallized aluminum layer as stainless steel, as seen through the generally clear polyester film layer. The polyester lamination film may also include an adhesive layer on a side applied to the appliance panel for attaching the film to the panel. Further, there may be a strippable film layer applied over the polyester lamination film to protect the panel during manufacture.

In making the appliance panel, a flat sheet of magnetizable material is provided, such as a blanked sheet of rolled steel. Then a polyester lamination film is adhered to a surface of the sheet material, wherein the polyester lamination film provides a stainless steel appearance to the material. Thereafter, the sheet is bent into a shape to form a finished panel for an appliance. A strippable film layer may also be applied over the polyester lamination film before the sheet is bent to protect the panel during manufacture. This strippable film layer may be applied to the polyester lamination film before or after the polyester lamination film is adhered to the sheet material.

DETAILED DESCRIPTION OF THE PREFERRED EMBODIMENT

The present invention relates to an appliance, a panel for an appliance, and a method of forming a panel for an appliance. A wide range of appliances could be provided with the panels as described herein, including refrigerators, freezers, washers, dryers, dishwashers, ovens, stoves, and similar well known appliances. The panels described may form more or less than one side of a particular appliance. That is, they may wrap around the appliance to form more than one side, or they may be a panel that covers only a portion of one side. Also, the panels may be formed into doors, shelves or other components of the appliance. The panels may be fixed in place relative to the appliance, or may be movable relative to other components of the appliance.

Figure 1:
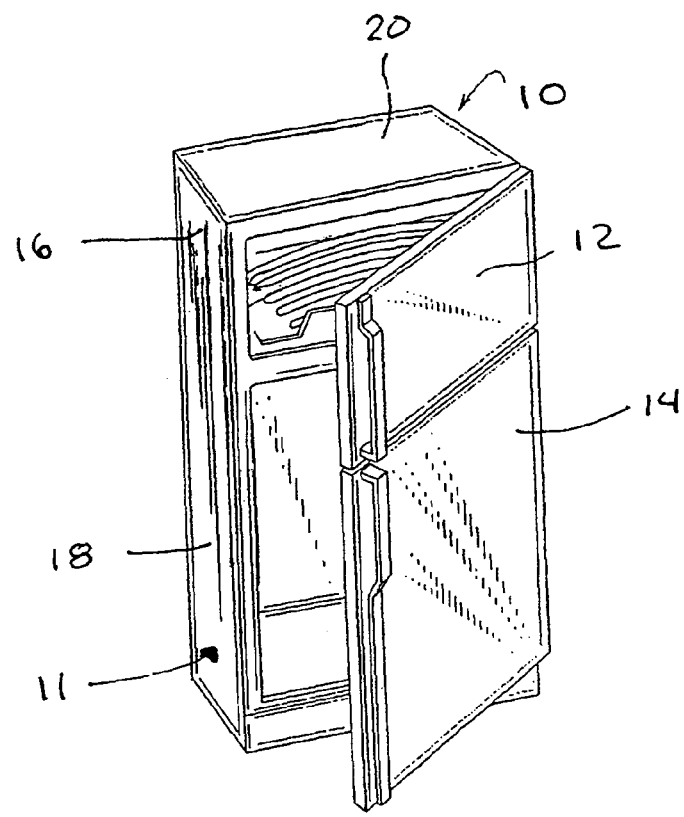
FIG. 1 is a perspective view of an appliance having a panel embodying the principles of the present invention.

In FIG. 1 there is shown a typical appliance 10 in which the present invention may be utilized, in the form of a refrigerator. Although only a single type of refrigerator is shown (with a small freezer compartment shown above a larger refrigeration compartment), the present invention may be used in any type of refrigerator (including single door units, side-by-side units and freezer on the bottom units), as well as other types of appliances as described above. This single appliance is illustrated merely to provide an environment in which the present invention may be utilized in an embodiment.

The appliance 10 is comprised of a number of panels 11 including exterior cabinet panels such as a small door panel 12, a large door panel 14, and a cabinet panel 16 which wraps around at least 2 sides, a left side 18 and a top side 20 as seen in FIG. 1. The panels 12, 14 and 16 may be formed as flat sheets, attached to the appliance in some known manner, or they may be shaped, such as by bending, such that they will not remain completely flat as a part of the appliance. The panels may be held in their formed shape by crimping, welding, use of rivets or threaded fasteners, or many other known methods used in forming appliance panels.

Figure 2:
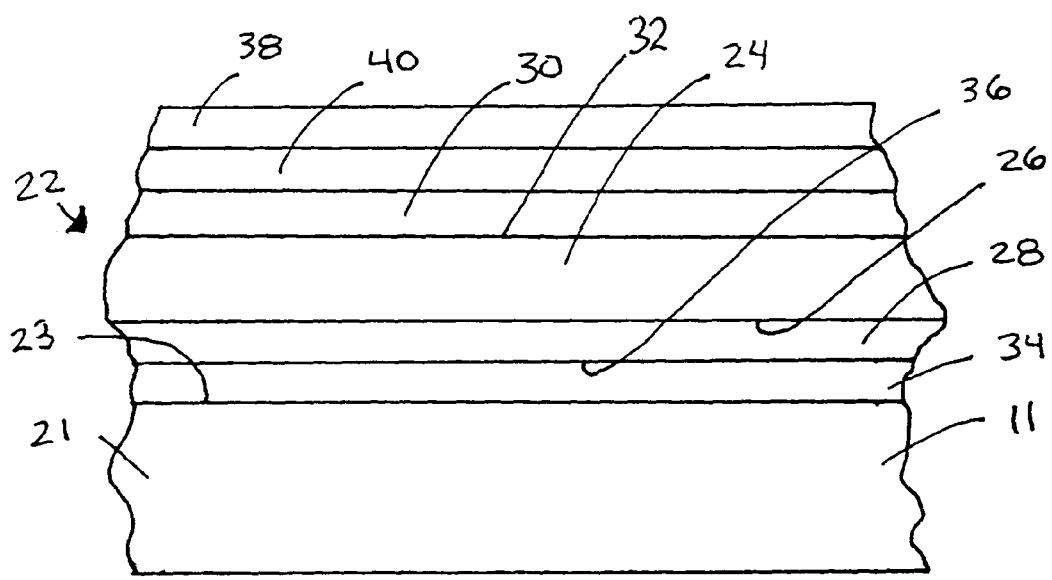
FIG. 2 is a side sectional view of the appliance panel of FIG. 1 with a polyester lamination film thereon.

In FIG. 2, there is shown a cross section of the appliance panel 11 formed of a magnetizable sheet material 21 with a polyester lamination film 22 adhered to a surface 23 of the material, wherein the polyester lamination film provides a stainless steel appearance to the appliance panel. The polyester lamination film 22 has the required durability features and characteristics necessary to provide a long service life for the panel 11 without deterioration and discoloration. The magnetizable sheet material 21 of the panel 11 may comprise rolled steel, which is relatively low in cost compared to stainless steel.

The polyester lamination film 22 may comprise a polyester film layer 24 with a backside 26 brushed to give a grain appearance simulating stainless steel, a vacuum metallized aluminum layer 28 deposited on the backside of the polyester film layer to provide a bright and shiny silver color, and a tinted coating layer 30 provided on a front side 32 of the polyester film layer. The tinted coating layer 30 should be colored to provide a correct color rendition of the metallized aluminum layer 28 as stainless steel, as seen through the generally clear polyester film layer 24. The polyester lamination film 22 may also include an adhesive layer 34 on a side 36 applied to the appliance panel 11 for attaching the film to the panel. The particular adhesive selected may be dependent on the appliance that the panel will be incorporated into in order to accommodate different environmental conditions. For example, a difference in temperature will be experienced between a freezer panel and an oven panel. A dishwasher panel will experience a higher humidity level than other appliance panels. Thus, an appropriate adhesive will need to be selected for a particular appliance. For a refrigerator, for example, an acceptable adhesive would be a solvent type, polyolefin based adhesive.

Further, there may be a strippable film layer 38 applied over the polyester lamination film 22, such as with an adhesive layer 40, to protect the panel 11 during manufacture. An example of a strippable film layer would be low-density polyethylene sheet with an acrylic or rubber-based adhesive.

The strippable film layer 38, along with its adhesive layer 40, may be removed after manufacture of the panel, after manufacture, but before shipment of the appliance, or at any time up to delivery and installation of the appliance at the end user's location.

In making the appliance panel 11, the flat sheet of magnetizable material 21 is provided, such as a blanked sheet of rolled steel. Then the polyester lamination film 22 is adhered to the surface 23 of the sheet material. The adhesive may be a layer on the polyester lamination film 22 or may be separately applied. Thereafter the sheet may be bent into a shape, if need be, to form the finished panel 11 for the appliance 10. The strippable film layer 38 may also be applied over the polyester lamination film 22 before the sheet is bent to protect the panel 11 during manufacture. This strippable film layer 38 may be applied to the polyester lamination film 22 before or after the polyester lamination film 22 is adhered to the sheet material 21.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

The embodiments of the invention in which an exclusive property or privilege is claimed are defined as follows:

1. An appliance selected from the group consisting of refrigerators, freezers, washers, dryers, dishwashers, ovens, stoves, ice makers, water dispensers, humidifiers, and dehumidifiers, having a panel formed of a rolled steel material forming at least a substantial portion of a side of the appliance and a polyester lamination film adhered directly to an entire outer surface of said panel, wherein said polyester lamination film comprises a substantially transparent polyester film layer with a brushed backside, a vacuum metallized aluminum layer deposited on said backside of said polyester film layer, a layer of adhesive on a side of said vacuum metallized aluminum layer opposite of said polyester film, and a tinted coating layer provided on a front side of said polyester film layer, the tinted coating layer being colored to provide a color rendition of the metalized aluminum layer as stainless steel, as seen through the substantially transparent polyester film layer, wherein the tinted coating layer, the brushed backside of the polyester film and the aluminum layer combine to provide a stainless steel appearance to said entire panel.

2. An appliance according to claim 1, including a strippable film layer applied over said polyester lamination film to protect said panel during manufacture.

3. An appliance according to claim 1, wherein said panel comprises bends in its surface.

4. An appliance according to claim 1, wherein said panel forms more than one side of side appliance.

5. An appliance selected from the group consisting of refrigerators, freezers, washers, dryers, dishwashers, ovens, stoves, ice makers, water dispensers, humidifiers, and dehumidifiers, comprising:
   a panel formed of a magnetizable material forming at least a substantial portion of a side of said appliance; and
   a polyester lamination film adhered directly to an entire outer surface of the panel, the polyester lamination film comprising:
      a transparent polyester film layer with a brushed backside surface;
      a vacuum metallized aluminum layer deposited on the brushed backside surface of the transparent polyester film layer,
      a layer of adhesive on a side of said polyester lamination film applied to said appliance panel, and
      a tinted coating layer provided on a front side of said polyester film layer, the tinted coating layer being colored to provide a color rendition of the metalized aluminum layer as stainless steel, as seen through the transparent polyester film layer;
   wherein said polyester lamination film provides a stainless steel appearance to said entire panel.

6. An appliance according to claim 5, including a strippable film layer applied over said polyester lamination film to protect said panel during manufacture.

7. An appliance according to claim 5, wherein said magnetizable material comprises rolled steel.

8. An appliance according to claim 5, wherein said panel comprises bends in its surface.

9. An appliance according to claim 5, wherein said panel forms more than one side of said appliance.

10. An appliance panel comprising:
    a magnetizable sheet material; and
    a polyester lamination film adhered directly to an entire outer surface of said material, the polyester lamination film comprising:
       a clear polyester film layer with a brushed backside surface;
       a vacuum metallized aluminum layer deposited on the brushed backside surface of said polyester film layer,
       a layer of adhesive on a side of said vacuum metallized aluminum layer opposite of said polyester film, and
       a tinted coating layer provided on a front side of said polyester film layer, the tinted coating layer being colored to provide a color rendition of the metalized aluminum layer as stainless steel, as seen through the clear polyester film layer;
    wherein said polyester lamination film provides a stainless steel appearance to said entire panel.

11. An appliance panel according to claim 10, wherein said magnetizable material comprises rolled steel.

12. An appliance panel according to claim 10, including a strippable film layer applied over said polyester lamination film to protect said panel during manufacture.

13. An appliance panel according to claim 10, wherein said panel comprises bends in its surface.

14. A method of making an appliance panel comprising the steps:
providing a flat sheet of magnetizable material,
adhering a polyester lamination film directly to an entire surface of said material while said material is in a flat form to provide a stainless steel appearance to the entire panel, said polyester lamination film comprising:
a substantially transparent polyester film layer with a brushed backside surface;
a vacuum metallized aluminum layer deposited on the brushed backside surface of said polyester film layer;
a layer of adhesive on a side of said vacuum metallized aluminum layer opposite of said polyester film; and
a tinted coating layer provided on a front side of said polyester film layer, the tinted coating layer being colored to provide a color rendition of the metalized aluminum layer as stainless steel, as seen through the substantially transparent polyester film layer;
bending said sheet into a shape to form a finished panel for a substantial portion of a side of an appliance selected from the group consisting of refrigerators, freezers, washers, dryers, dishwashers, ovens, stoves, ice makers, water dispensers, humidifiers, and dehumidifiers.

15. A method of making an appliance panel according to claim 14, including the further step of adhering a strippable film layer over said polyester lamination film prior to bending said sheet into a shape to protect said panel during manufacture.

16. A method of making an appliance panel according to claim 14, wherein said magnetizable material comprises rolled steel.

* * * * *

UNITED STATES PATENT AND TRADEMARK OFFICE
CERTIFICATE OF CORRECTION

| | | |
|---|---|---|
| PATENT NO. | : 8,012,595 B2 | Page 1 of 1 |
| APPLICATION NO. | : 10/979591 | |
| DATED | : September 6, 2011 | |
| INVENTOR(S) | : Kevin R. Leatherwood et al. | |

It is certified that error appears in the above-identified patent and that said Letters Patent is hereby corrected as shown below:

Col. 4, lines 10 --, Claim 4: "An appliance according to claim 1, wherein said panel forms more than one side of side appliance." - should be Claim 4: -- An appliance according to claim 1, wherein said panel forms more than one side of said appliance. --

Signed and Sealed this
Ninth Day of October, 2012

David J. Kappos
*Director of the United States Patent and Trademark Office*